United States Patent
Galea

(10) Patent No.: US 8,910,536 B2
(45) Date of Patent: Dec. 16, 2014

(54) LOCKING DEVICE FOR INHIBITING THE ENGAGEMENT OF THE REVERSE GEAR OF A MOTOR VEHICLE TRANSMISSION

(75) Inventor: Alexander Galea, Dingli (MT)

(73) Assignee: Methode Electronics Malta, Ltd., Mriehel (MT)

( * ) Notice: Subject to any disclaimer, the term of this patent is extended or adjusted under 35 U.S.C. 154(b) by 148 days.

(21) Appl. No.: 13/597,518

(22) Filed: Aug. 29, 2012

(65) Prior Publication Data

US 2014/0060228 A1 Mar. 6, 2014

(51) Int. Cl.
*F16H 61/16* (2006.01)
*F16H 63/34* (2006.01)

(52) U.S. Cl.
CPC .............. *F16H 61/16* (2013.01); *F16H 63/34* (2013.01)
USPC ..................................... 74/473.22; 74/473.25

(58) Field of Classification Search
CPC ................................ F16H 61/16; F16H 63/34
USPC ............... 74/473.21, 473.22, 473.23, 473.24, 74/473.25
See application file for complete search history.

(56) References Cited

U.S. PATENT DOCUMENTS

| | | | |
|---|---|---|---|
| 1,867,061 A * | 7/1932 | Cartwright | 74/473.22 |
| 4,337,673 A * | 7/1982 | Kawamoto | 74/473.22 |
| 5,523,684 A | 6/1996 | Zimmermann | |
| 5,566,581 A * | 10/1996 | Smale et al. | 74/473.22 |
| 5,829,309 A * | 11/1998 | Wagner et al. | 74/473.22 |
| 5,857,938 A * | 1/1999 | Porter | 477/99 |
| 6,186,021 B1 * | 2/2001 | Wollschlaeger | 74/473.22 |
| 6,286,384 B1 * | 9/2001 | Schnapp | 74/473.22 |
| 7,779,715 B2 * | 8/2010 | Mitteer | 74/473.23 |
| 2003/0010145 A1 * | 1/2003 | Seekircher | 74/336 R |
| 2014/0060228 A1 * | 3/2014 | Galea | 74/473.22 |
| 2014/0165765 A1 * | 6/2014 | Fontana | 74/473.22 |

FOREIGN PATENT DOCUMENTS

DE     102009035175 A1     2/2010

OTHER PUBLICATIONS

U.S. Appl. No. 13/710,835, filed Dec. 11, 2012.

* cited by examiner

*Primary Examiner* — David M Fenstermacher
(74) *Attorney, Agent, or Firm* — Thompson Coburn LLP

(57) ABSTRACT

A locking device for inhibiting the engagement of the reverse gear of a motor vehicle transmission has an inhibitor (2) arranged in a housing (1). The inhibitor (2) prevents the movement of a transmission part (15) of the transmission in a first position and permits the movement of the transmission part (15) in a second position. A sensor (8) for indicating the engaged reverse gear is further provided in the housing (1). The inhibitor (2) is axially movable in the housing (1) and follows the movement of a core part (3), which is likewise movable in the axial direction through a solenoid arrangement (18) provided in the housing (1). The coil (5) of the solenoid arrangement (18) surrounds the core part (3). The solenoid arrangement (18) is arranged in a chamber (9) of the housing (1).

15 Claims, 2 Drawing Sheets

Figure 1:
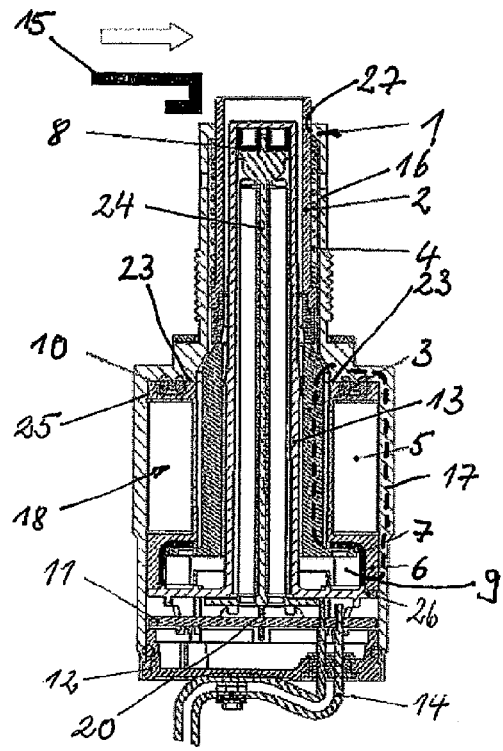

LOCKING DEVICE FOR INHIBITING THE ENGAGEMENT OF THE REVERSE GEAR OF A MOTOR VEHICLE TRANSMISSION

The present invention relates to a locking device for inhibiting the engagement of the reverse gear of a motor vehicle transmission.

DE 43 37 524 A1 reveals a locking device for an automatic transmission in which a locking mechanism is provided serving for locking an engagement pin, whereas the engagement pin is required for shifting a gearshift lever from one parking position into another parking position. Furthermore, the locking device comprises an actuator for releasing the locking state of the locking mechanism, a control switch for determining whether or not the gearshift lever is in the parking position and for generating a corresponding signal, and a control device for receiving the signal from the control switch and for generating a corresponding signal for controlling the actuator. The locking mechanism, the actuator, the control switch and the control circuit are arranged in a housing.

In conventional manually operated transmissions, the reverse gear is normally actuated by depressing the clutch pedal and activating a trigger device on the gearshift lever, with said trigger device deactivating an inhibitor for preventing the mechanical engagement of the reverse gear within the transmission through a cable mechanism and allowing the user to select the reverse gear. An electromechanical switch, or in some cases a simple position sensor, is placed through an aperture in the transmission in order to detect that the reverse gear has been engaged.

It may occur sometimes that the driver shifts into reverse gear in situations where the vehicle is still moving at a relatively high speed. This leads to significant damage to the transmission.

It is known to use a solenoid arrangement for activating and deactivating the inhibitor for locking the reverse gear. The activation and the control of the solenoid arrangement are usually triggered externally, and the indication of the reverse gear requires a separate switch or sensor.

The technical problem of the present invention is to develop a safely operating locking device for inhibiting the engagement of the reverse gear of a motor vehicle transmission.

This technical problem is solved by means of a locking device, in particular for inhibiting the engagement of the reverse gear of a motor vehicle transmission, comprising an inhibitor, which is arranged in a housing and which is movable between a first and a second position. Said inhibitor prevents the movement of a transmission part of the transmission in the first position and permits the movement of the transmission part in the second position. In addition, a sensor for indicating the engaged reverse gear is provided in the housing. The inhibitor is axially movable in the housing. It follows the movement of a core part being likewise movable in the axial direction through a solenoid arrangement provided in the housing, whereas the coil of the solenoid arrangement surrounds the core part. The solenoid arrangement and the inhibitor are, protected against contaminants, tightly arranged in a chamber of the housing.

It is an essential advantage of the present invention that the present locking device includes in one single unit both the solenoid arrangement for inhibiting the engagement of the reverse gear and the mechanism for detecting the reverse gear. Advantageously, this unit can also comprise the necessary logic control circuit actuating the solenoid arrangement when the right conditions are satisfied. The unit is constructed in such a way that contaminants which are, in particular, due to oil can be avoided. Expediently, the movable mechanical components are also protected. If required, the logic control circuit and the driver can also be arranged outside of the aforementioned module.

In a preferred embodiment of the invention, a printed circuit board comprising a control unit is arranged within the chamber, whereas the control unit is connected to the sensor for determining the output signal of the latter.

Particularly advantageously, the chamber is tightly closed by means of a sealing member on the side opposite to the sensor.

Expediently, the core part and the inhibitor each have the shape of a tube and are arranged one behind the other on a tubular support part.

In an advantageous embodiment of the invention, the housing comprises a first tubular housing section as well as a second tubular housing section, which adjoins thereto in the axial direction and which is radially extended compared to the first housing section. The inhibitor is arranged in the first housing section. Between the inhibitor and the outer wall of the first housing section, a compression spring is provided, which preloads the inhibitor against the core part. It is also possible to construct the inhibitor and the core part as one piece.

Preferably, the inhibitor can be moved to the second position through an aperture of the housing or the first housing section. In particular, one end of the compression spring rests on the first housing section and the other end of the compression spring on the inhibitor.

In another advantageous embodiment of the invention, the core part and a coil support member supporting the coil of the solenoid arrangement are arranged in the second housing section, whereas the coil support member rests on a shoulder between the first and second housing section by means of an annular seal.

The inhibitor, the sensor with the support part supporting the latter and the solenoid arrangement are advantageously combined in one unit insertable in the chamber in such a way that the chamber is sealed between the seal and the unit. The chamber is expediently closable by means of a sealing member on the side opposite to the sensor. The inhibitor, the sensor with the support part supporting the latter, the solenoid arrangement as well as the printed circuit board can likewise be combined in one unit insertable in the chamber in such a way that the chamber is sealed between the seal and the unit, whereas the chamber is closable by means of a sealing member on the side opposite to the sensor. Expediently, an electrical connection may tightly pass from the chamber through the sealing member.

It is especially advantageous that the inhibitor is capable of being moved to the second position through an aperture of the housing and/or the first housing section. A particular advantage is that the user can engage the reverse gear, without an additional force for operating a known spring-loaded linkage being required for the shifting into reverse gear.

Particularly preferably, a sensor developed as an eddy current sensor is used, which is arranged on the side of the support part opposite to the solenoid arrangement and which comprises a coil, by which a magnetic field can be generated, whereas in case the metallic transmission part moves through the magnetic field, a signal is generated due to an eddy current effect, with said signal indicating that the reverse gear is in an engaged position. Due to the fact that an eddy current sensing system is provided, a touch-less and contact-less reverse gear engaged detection is advantageously possible, without the existence of a permanent magnetic field being necessary.

Expediently, the sensor is mounted on a retaining rod arranged in the support part, whereas a signal line runs through the retaining rod to the printed circuit board.

Figure 2:
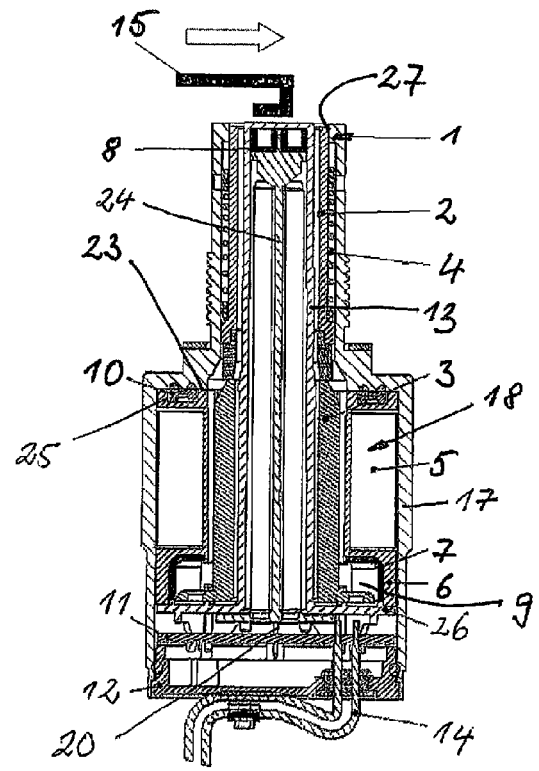
Figure 3:
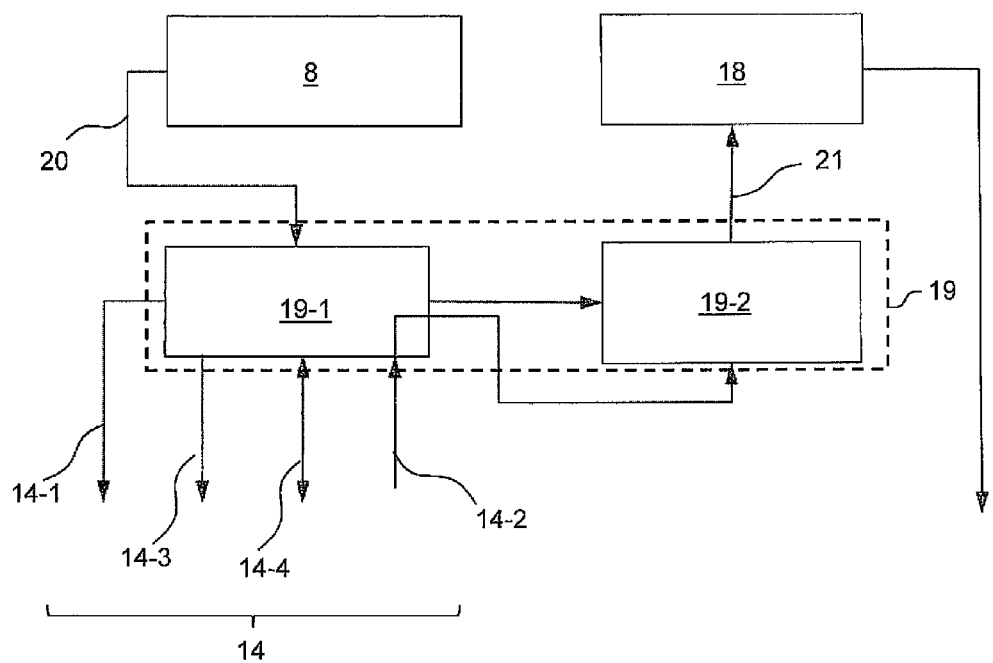

The inventions and its embodiments are described in more detail below in connection with the figures, wherein:

FIG. 1 is a sectional view of the locking device according to the invention in the released state, FIG. 2 is a sectional view of the locking device according to the invention in the locking state, and FIG. 3 shows a logic control circuit for controlling the locking device according to the invention.

According to FIG. 1, the present locking device essentially comprises a hollow metal housing 1, in which an inhibitor 2, a core part 3, a metal part 7 and a sensor head 8 are arranged. Preferably, the metal housing 1 comprises two housing sections 16 and 17 being axially arranged one behind the other, whereas the first, preferably tubular, housing section 16 has a smaller diameter than the second, preferably also tubular, housing section 17. A radial shoulder 23 is provided in the transition region between the housing sections 16 and 17.

Preferably, the tubular inhibitor 2 is concentrically arranged in the first housing section 16. It is preferably made from hardened steel material to withstand the high forces coming from within the transmission. Between the inner wall of the first housing section 16 and the outer wall of the inhibitor 2, a compression spring 4 is arranged, which preloads the inhibitor 2 such that it protrudes the aperture arranged at the top of FIG. 1. This state is illustrated in FIG. 1. Inside the inhibitor 2, a tubular support part 13 is arranged preferably concentrically to the inhibitor 2 on the side of the free end of the first housing section 16, whereas the support part 13 is closed by means of a preferably radially extending wall and comprises in the region of the free end of the first housing section 16 the sensor 8, which will be described in more detail below. The inhibitor 2 is axially movably supported on the support part 13. The support part 13 also passes through the second housing section 17.

When viewed in the axial direction, the core part 3, which is preferably made from iron, adjoins to the inhibitor 2 on the side opposite to the free end of the first housing section 16, whereas said core part 3 has likewise the shape of a tube and is movably supported on the support part 13.

The core part 3 is surrounded by an electrical coil 5 being fixed in the second housing section 17 of the housing 1. The coil support member supporting the coil 5 is identified by reference numeral 6. The support member 6 and the coil 5 form a solenoid arrangement 18, in which the core part 3 is movable on the support part 13.

The inhibitor 2 follows the movement of the core part 3, which expediently is made from soft magnetic steel. The inhibitor 2 and the core part 3 can be mechanically coupled and/or connected to each other such that they form a unitary moving part. Alternatively, the inhibitor 2 and the core part 3 can also be held together by the compression spring 4.

The metal housing 1 and the metal part 7 being attached to the coil support member 6 form part of the magnetic circuit of the solenoid arrangement 18. The annular metal part 7 is preferably provided at the lower end of the support member 6 in such a way that it forms a magnetic bridge between the housing 1 and/or the second housing section 17 and the core part 3. This magnetic circuit is marked in dashed lines in FIG. 1 (on the right).

The unit comprising the inhibitor 2 and the core part 3 is preloaded towards the side facing the lower end of the housing 1 by means of the compression spring 4, which, on the one hand, rests on the upper end of the housing 1 and, on the other hand, on the core part 3. FIG. 1 shows the excited state of the solenoid arrangement 18. In this state, the inhibitor 2 is moved against the force of the compression spring 4 such that its upper end protrudes the housing 1.

When the solenoid arrangement 18 is in the excited state, the core part 3 and the inhibitor 2 are moved to a second postion due to the force of the compression spring 4 such that the upper end of the inhibitor 2 is moved into the housing 1 according to FIG. 2.

At the upper end of the housing 1, a metallic transmission part 15 is located, which is, for example, movable perpendicularly to the longitudinal axis of the housing 1 and which is either or not in front of the support part 13, depending on whether or not the reverse gear is engaged. This means that in case the inhibitor 2 is in the state as shown in FIG. 1, the transmission part 15 is blocked against lateral movement by means of the sensor 8 such that a driver of the motor vehicle containing the transmission cannot shift into reverse gear. When the inhibitor 2 is in the state as shown in FIG. 2, however, the transmission part 15 is not blocked such that it is movable by the sensor 8 and the driver can shift into reverse gear.

On the side of the free end of the first housing section 16, the sensor 8 is preferably mounted and/or arranged on a retaining rod 24 being disposed within the support part 13 and preferably extending along a longitudinal central axis of the housing 1. Preferably, the sensor 8 comprises a coil, by which a magnetic field is generated. When the metallic transmission part 15 is moved through a magnetic field, a signal is generated by the sensor 8 due to the known eddy current effect, whereas the signal indicates that the reverse gear is in an engaged position. The signal line(s) 20 of the sensor 8 expediently run through an axial bore of the retaining rod 24.

Since the first housing section 16 and the second housing section 17 are shaped in a tubular manner, a space is formed in their interior, which serves for receiving the support part 13 and the sensor 8 supported therein with the retaining rod 24, the inhibitor 2 and the compression spring 4 in the first housing section 16 as well as the solenoid arrangement 18, which comprises the core part 3, the coil support member 6, the coil 5 and the metal part 7, in the second housing section 17. In the second housing section 17, the chamber 9 is formed, which is delimited from the first housing section 16 by the shoulder 23. On the side facing the shoulder 23, the coil support member 6 has a radial section 25 which in the mounting state tightly abuts on the shoulder 23 by means of a seal 10.

In the chamber 9, a printed circuit board 11 is preferably arranged on the side facing the free end of the second housing section 17. Preferably, the printed circuit board 11 is tightly connected to the lower end of the support part 13 in the obvious manner. The printed circuit board 11 supports the electronic control circuit 19, which will be described in more detail below in connection with FIG. 3. The electrical lines leading outwards from the control circuit 19 are identified by reference numeral 14. The sensor 8 is connected to the control circuit 19 through the aforementioned signal line 20. The solenoid arrangement 18 is connected to the control circuit 19 through a line 21. On the side facing the free end of the housing section 17, the chamber 9 is sealed to the outside by means of a sealing member 12, which tightly closes the second housing section 17 and through which the lines 14 are closely conducted, such that said chamber is completely dry and free from contaminating oil and/or other fluids and/or dirt particles.

As already mentioned above, the solenoid arrangement 18, the printed circuit board 11 connected to the coil support member 6, the support part 13 containing the sensor 8 as well as the retaining rod 24 supporting the sensor 8 can preferably be inserted in the housing 1 from the bottom as a unit, whereas the chamber 9 is automatically sealed by the seal 10 towards the side of the first housing section 16 and by the sealing member 12 towards the outside. The support member 6 and a lower radially extending flange 26 of the support part 13 are either manufactured as one piece or irreversibly connected to each other by a welding step.

The output signal of the sensor 8 is either directly applied through the signal line 20 to the control circuit 19 of FIG. 3, which can be arranged on the printed circuit board 11 (PCB) as described above. The control circuit 19 processes the signal in order to switch on the reverse light indicator. The power supply lines for the control circuit 19 are identified in FIG. 3 by reference numerals 14-4 and 14-2. The line leading to the switch for the reverse light is identified by reference numeral 14-3. A further exchange of signals is possible through the line 14-4. The control circuit 19 comprises a logic control unit 19-1 for signal processing as well as a switching unit 19-2 for switching the solenoid arrangement 18.

While specific embodiments have been described in detail in the foregoing detailed description and illustrated in the accompanying drawings, those with ordinary skill in the art will appreciate that various modifications and alternatives to those details could be developed in light of the overall teachings of the disclosure. Accordingly, the particular arrangements disclosed were meant to be illustrative only and not limited as to the scope of the invention which is to be given the full breadth of the appended claims and any equivalents thereof.

REFERENCE NUMERALS 1 housing
2 inhibitor
3 core part
4 compression spring
5 coil
6 coil support member
7 metal part
8 sensor
9 chamber
10 seal
11 printed circuit board
12 sealing member
13 support part
14 line
15 transmission part
16 housing section
17 housing section
18 solenoid arrangement
19 control unit
20 signal line
21 line
22 stop member
23 shoulder
24 retaining rod
25 section
26 flange
27 aperture
14-1 line
14-2 line
14-3 line
14-4 line
19-1 control unit
19-2 switching unit

What is claimed is:

1. A locking device, in particular for inhibiting the engagement of the reverse gear of a motor vehicle transmission, comprising an inhibitor (2) arranged in a housing (1) and being movable between a first and a second position, whereas the inhibitor (2) prevents the movement of a transmission part (15) of the transmission in the first position and permits the movement of the transmission part (15) in the second position, whereas a sensor (8) for indicating the engaged reverse gear is further provided in the housing (1), characterized in that the inhibitor (2) is axially movable in the housing (1) and follows the movement of a core part (3), which is likewise movable in the axial direction by a solenoid arrangement (18) provided in the housing (1), whereas the coil (5) of the solenoid arrangement (18) surrounds the core part (3), and the solenoid arrangement (18) and the inhibitor (2) are, protected against contaminants, tightly arranged in a chamber (9) of the housing (1).

2. A locking device according to claim 1, characterized in that a printed circuit board (11) comprising a control unit (19) is arranged within the chamber (9), whereas the control unit (19) is connected with the sensor (8) for determining the output signal of the latter.

3. A locking device according to claim 1, characterized in that the chamber (9) is tightly closed by means of a sealing member (12) on the side opposite to the sensor (8).

4. A locking device according to claim 1, characterized in that the inhibitor (2) and the core part (3) each have the shape of a tube and are arranged one behind the other on a tubular support part (13).

5. A locking device according to claim 4, characterized in that the housing (1) comprises a first tubular housing section (16) as well as a second tubular housing section (17), which adjoins thereto in the axial direction and is radially extended compared to the first housing section (16), the inhibitor (2) is arranged in the first housing section (16), and a compression spring (4), which preloads the inhibitor (2) against the core part (3) is provided between the inhibitor (2) and the outer wall of the first housing section (16).

6. A locking device according to claim 1, characterized in that the inhibitor (2) can be moved to the second position through an aperture (27) of the housing (1).

7. A locking device according to claim 5, characterized in that the inhibitor can be moved to the second position through an aperture of the first housing section (16).

8. A locking device according to claim 5, characterized in that one end of the compression spring (4) rests on the first housing section (16) and the other end of the compression spring (4) on the inhibitor (2).

9. A locking device according to claim 1, characterized in that the core part (3) and a coil support member (6) supporting the coil (5) of the solenoid arrangement (18) are arranged in the second housing section (17), whereas the coil support member (6) rests on a shoulder (23) between the first (16) and second (17) housing section by means of an annular seal (10).

10. A locking device according to claim 1, characterized in that the inhibitor (2), the sensor (8) with the support part (13) supporting the latter and the solenoid arrangement (18) are combined in one unit insertable in the chamber (9) in such a way that the chamber (9) is sealed between the seal (10) and the unit, and the chamber (9) is closable by means of a sealing member (12) on the side opposite to the sensor (8).

11. A locking device according to claim 2, characterized in that the inhibitor (2), the sensor (8) with the support part (13) supporting the latter, the solenoid arrangement (18) as well as the printed circuit board (11) are combined in one unit insertable in the chamber (9) in such a way that the chamber (9) is sealed between the seal (10) and the unit, and the chamber (9) is closable by means of a sealing member (12) on the side opposite to the sensor (8).

12. A locking device according to claim 10, characterized in that an electrical connection (14) tightly passes through the sealing member (12) to the outside.

13. A locking device according to claim 1, characterized in that the sensor (8) is an eddy current sensor, which is arranged on the side of the support part (13) opposite to the solenoid arrangement (18) and which comprises a coil (5), by which a magnetic field can be generated, whereas in case the metallic transmission part (15) moves through the magnetic field, a signal is generated due to an eddy current effect, with said signal indicating that the reverse gear is in an engaged position.

14. A locking device according to claim 1, characterized in that the sensor (8) is mounted on a retaining rod (24) arranged in the support part (13), whereas a signal line (20) runs through the retaining rod (24) to the printed circuit board (11).

15. A locking device according to claim 1, characterized in that the solenoid arrangement (18) comprises an annular metal part (7) forming a bridge for the magnetic flux between the metal housing (1) or the second metal housing section (17) and the core part (3).

* * * * *